3,356,882
SPARK PLUG HAVING THE CENTER ELECTRODE SHEATH WITH A NICKEL ALLOY
William J. Hallauer, Dearborn Heights, and Bill L. Potts, Grosse Pointe Woods, Mich., assignors to Ford Motor Company, Dearborn, Mich., a corporation of Delaware
Filed Oct. 21, 1965, Ser. No. 499,255
12 Claims. (Cl. 313—141)

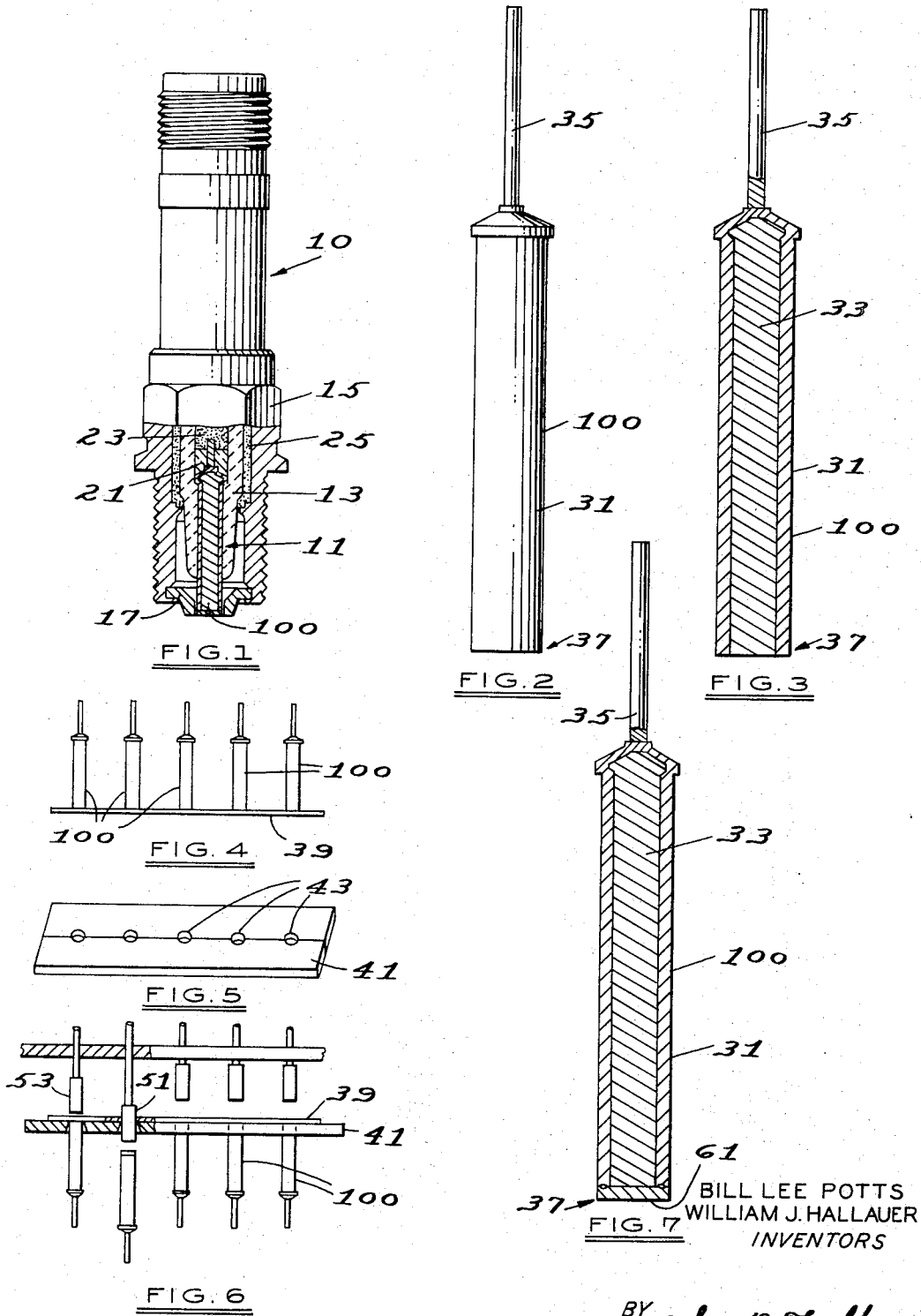
Dec. 5, 1967    W. J. HALLAUER ET AL    3,356,882
SPARK PLUG HAVING THE CENTER ELECTRODE
SHEATH WITH A NICKEL ALLOY
Filed Oct. 21, 1965
BILL LEE POTTS
WILLIAM J. HALLAUER
INVENTORS
BY John R. Faulkner
Olin B. Johnson
ATTORNEYS United States Patent Office 3,356,882
Patented Dec. 5, 1967

ABSTRACT OF THE DISCLOSURE

A spark plug electrode, the method of manufacturing said electrode and a spark plug employing said electrode, said electrode comprising a rod having a metal core, a tubular metal sheath encompassing said core for a substantial portion of its length, and, at the firing end of said electrode a metal cap abutting said core, welded to and abutting one end of said tubular sheath, and forming with said sheath an essentially gas-tight seal, said core having a higher conductivity than said sheath and said cap, said sheath and said cap having a substantially greater resistance to erosion and corrosion than said core, said method including positioning said sheath and core against the metal sheet from which said cap is to be formed, forming a continuous ring weld of said sheet material to said sheet and shearing the resultant capped electrode from said sheet material.

---

This invention relates to an improved spark plug electrode and to a method of manufacturing the same.

It is conventional to employ as the center electrode of a spark plug a conductor comprising a copper core encased in a tubular sheath of a nickel alloy or other suitable material. Copper, because of its high heat conductivity, aids in dissipating heat at the firing end of the electrode and, hence, minimizes the possibility of pre-ignition. The firing end of the electrode, unless suitably capped, still presents unprotected copper to the gases released by combustion and this gradually wears away leaving at the end a hollow tube formed by the protective sheath. Such condition is conducive to pre-ignition with resultant short operational life for the spark plug.

It has been suggested by Lentz et al. in U.S. Patent 3,119,944 to remove copper at the firing end of the electrode leaving a recess therein, filling the recess with a brazing material such as nickel and phosphorous, heating to brazing temperature, melting the brazing material, cooling, and smoothing the firing end of the electrode by forming over part of the sheath or by cutting off the tip of the end after the brazing material is fired and cooled. While this method offers certain obvious advantages over previously used methods wherein a protective pin or rivet is mechanically connected with the copper end, it requires a separate machining operation to provide the recess for the brazing material and provides a hidden connection between core and brazing material which is not easily inspected. In addition, brazing is a relatively slow process.

The electrode according to the present invention is made by employing a composite rod with a core of highly conductive metal such as copper and a protective sheath, preferably of Inconel, nickel, or other suitable nickel alloy, and capping the firing end with a suitably conductive, corrosion-resistant metal by welding the sheath at the firing end of the electrode to a suitable sheet stock and separating the capped electrode from the sheet stock with a shearing operation which provides an essentially automatic check of the sufficiency of the weld in that defective connections between weld and sheath are revealed by the act of separation.

It is, therefore, a principal object of the invention to provide, for use in a spark plug, an improved electrode having high heat conductivity and high resistance to erosion and corrosion.

Another object of this invention is to provide a more efficient method of manufacturing a spark plug electrode having a corrosion-resistant tip effectively bonded to the main part of the electrode.

Other object and advantages of the invention will be apparent from the following detailed description of specific embodiments when read in connection with the accompanying drawings, in which:

FIGURE 1 is a view in partial vertical cross section of a spark plug employing a center electrode according to the invention;

FIGURE 2 is an enlarged side view of the center electrode prior to capping;

FIGURE 3 is an enlarged view of the center electrode in cross section prior to capping;

FIGURE 4 is a side view of a plurality of the electrodes shown in the previous figures welded to an Inconel strip;

FIGURE 5 is a female die member into which the electrodes of FIGURE 4 may be inserted for separation from the Inconel strip;

FIGURE 6 is a side view of the electrodes and Inconel strip of FIGURE 4 positioned with the electrodes extending through the openings in the die member of FIGURE 5, the assembly being shown in the process of electrode separation in which a male die member in the form of punch means is employed in cooperation with the female die member; and FIGURE 7 is an enlarged view of the center electrode in cross section with the firing end capped in accordance with this invention.

Referring to FIGURE 1, there is shown a spark plug 10 which includes in its assembly a center electrode 100 formed in accordance with the instant invention. The spark plug shown is a type commonly used in aircraft but it will be understood that the present invention is not concerned with the ultimate use of the spark plug and that such use in no way constitutes a limitation upon this invention.

The spark plug 10 includes a center sparking assembly 11, an insulating body 13, a metal shell 15, and a ground electrode 17. The center sparking unit 11 includes a center electrode 100, embodying the principles of this invention, sealed in the shell 15 by any suitable means, here exemplified by conventional seals 21 and 23. The insulator and center electrode assembly are held in gas-tight sealed relationship to the shell by, for example, a sealing and holding body 25.

Referring now to FIGURES 2 to 7, the center electrode 100, prior to capping comprises a tubular sheath 31 and a copper core 33 having a wire lead 35 of lesser diameter. Lead 35 is wire of highly conductive metal, e.g. Kovar, for electrically connecting the electrode 100 with an electrical power source when electrode 100 is positioned within the spark plug 10 as illustrated in FIGURE 1 and spark plug 10 is operatively employed. Lead 35 is welded, or otherwise secured to core 31 by conventional means. Current is led to the center electrode through lead 35 in a conventional manner which forms no part of the present invention. Sheath 31 is preferably nickel, a nickel alloy or other suitable material which is a relatively good conductor of electricity, has a high resistance to erosion and corrosion relative to copper and can be welded. The electrical conductivity of the sheath should be as close to that of copper as can be achieved without sacrificing significant corrosion resistance. A typical alloy for this use is Inconel, an alloy of 80% nickel, 14% chromium and 6% iron. A typical sheath has a wall thickness of about 0.030 inch. A typical cross-sectional diameter for core 33 is about 0.094 inch. The firing end of the electrode 100 is herein identified by the numeral 37.

The firing end of each of the uncapped electrodes is welded to a suitable sheet material 39 having an electrical conductivity similar to that of sheath 31 and a resistance to corrosion that is substantially above that of copper. The sheet material most suitable for this use is nickel or a nickel alloy and may have the same or a different composition with respect to that of sheath 31. Inconel is suitable for this purpose and will be used hereinafter by way of illustration and to avoid unnecessary duplication in describing the method used in manufacturing the instant electrodes. A plurality of such electrodes are welded to an Inconel strip. A typical strip is 0.150 inch wide and 0.050 inch thick. Such a strip with electrodes welded thereto is illustrated in FIGURE 4.

The electrodes may be welded to the Inconel strip by conventional resistance projection welding at intervals of about one-half inch or less. With electrodes of the size hereinbefore disclosed, it was found advantageous to have the width of the Inconel strip at least about .037 inch greater than the outside diameter of the tubular sheath of the electrodes. The Inconel strip is less than about 0.1 inch in thickness. A thickness of about 0.030 to about 0.070 inch is advantageous to allow for upset in welding. A thickness of about 0.40 to about 0.60 inch is preferred. The firing end of the electrode may be cut at a small angle, e.g. 5°, leaving a slightly concave end. The sheath is advantageously cut back from the uncapped copper core at the end to be capped, e.g. about 0.20 inch, to compensate for upset of the capping metal in welding. This permits a strong resistance weld between the sheath and the capping material with the copper core in intimate contact with the welded end cap. The end of the core abutting the cap preferably terminates in a substantially flat surface extending to within less than about 0.1 inch of the firing end of the electrode. This end of the core is preferably substantially equal in cross-sectional area to the maximum cross-sectional area of such core.

The following welding schedule and conditions were successfully employed with the electrodes and Inconel strips hereinbefore described.

| | |
|---|---|
| Electrode force, pounds | 510 |
| Current, amperes | 7,500 |
| Weld time, cycles | 8 |

These conditions are exemplary and should not be interpreted as critical. The continuous ring-like welds made by this method provide between the sheath and cap an essentially gas-tight seal but will not disturb the copper core, thus avoiding the creation of a void between the cap and the core.

Referring now to FIGURES 4, 5 and 6, the Inconel strip 39 with electrodes 100 welded thereto is inverted with the electrodes passing through openings 43 in female die 41. A male die member or punch 51 is shown in fully home position in relation to female die 41 directly above a capped and separated electrode shown dropping from strip 39 and die 41. A second punch 53 is shown descending toward strip 39 preparatory to cooperating with die 41 in shearing the next electrode from strip 39. The capped electrode of FIGURE 7 comprises the components hereinbefore recited for the uncapped electrode shown in FIGURE 3 with the addition of cap 61.

The shearing operation serves the additional purpose of providing a quality check upon the welds thus prepared. Depending upon the degree of insufficiency of weld, the cap may be removed from the sheath by the force of the shearing action or, if the cap is still attached, welds which have significant voids or openings can be detected by visual inspection.

It will be understood that modification of the described embodiments can be made without departing from the scope of the invention as set forth in the accompanying claims.

We claim:
1. An electrode for a spark plug, said electrode comprising a rod having a metal core, a tubular metal sheath encompassing said core for a substantial portion of its length, and, at the firing end of said electrode, a metal cap abutting said core, welded to and abutting one end of said tubular sheath, and forming with said sheath an essentially gas-tight seal, said core having a higher conductivity than said sheath and said cap, said sheath and said cap having a substantially greater resistance to erosion and corrosion than said core.

2. An electrode for a spark plug, said electrode comprising a rod having a metal core, a tubular sheath encompassing said core for a substantial portion of its length, and, at the firing end of said electrode, a metal cap centrally abutting said core, peripherally welded to and abutting said sheath, and forming with said sheath an essentially gas-tight seal, said core having a higher heat conductivity than said sheath and said cap, said sheath and said cap having a substantially greater resistance to erosion and corrosion than said core.

3. An electrode for a spark plug, said electrode comprising a rod having a metal core, a tubular metal sheath of substantially uniform diameter throughout its length encompassing said core for a substantial portion of its length, and, at the firing end of said electrode, a metal cap centrally abutting said core, peripherally welded to and abutting said sheath, and forming with said sheath an essentially gas-tight seal, the cap-abutting end of said core terminating in a substantially flat surface, said core having a higher heat conductivity than said sheath and said cap, said sheath and said cap having a substantially greater resistance to erosion and corrosion than said core.

4. An electrode for a spark plug, said electrode comprising a copper core, a tubular metal sheath encompassing said core for a substantial portion of its length, and, at the firing end of said electrode, a metal cap centrally abutting said core, peripherally welded to and abutting one end of said sheath, and forming with said sheath an essentially gas-tight seal, a major proportion of said metal sheath and said metal cap being formed of nickel and having an average thickness below about 0.1 inch, the cap-abutting end of said core terminating in an essentially flat surface and having a cross-sectional area not significantly lesser than the maximum cross-sectional area of the same.

5. An electrode for a spark plug, said electrode comprising a copper core, a tubular metal sheath encompassing said core for a substantial portion of its length, a metal cap centrally abutting said core, peripherally welded to and abutting one end of said sheath, and forming with said sheath an essentially gas-tight seal, a major proportion of said metal sheath and said metal cap being formed of nickel, the cap-abutting end of said core terminating in an essentially flat surface positioned less than about 0.1 inch from the firing end of said electrode.

6. An electrode for a spark plug, said electrode comprising a copper core, a tubular Inconel sheath of substantially uniform diameter encompassing said core for a substantial portion of its length, and, at the firing end of said electrode, an Inconel cap centrally abutting said core, peripherally welded to and abutting one end of said sheath, and forming with said sheath an essentially gas-tight seal.

7. A spark plug comprising a metal shell, a ground electrode secured to said shell, an insulator supported by said shell and having a centrally positioned passageway therein, and a composite electrode inserted in said passageway and having a firing end in spaced relationship to said ground electrode to form a spark gap therebetween, said composite electrode comprising a rod having a metal core, a tubular sheath encompassing said core for a substantial portion of its length, and, at said firing end, a metal cap abutting said core, welded to and abutting one end of said sheath, and forming with said sheath an essentially gas-tight seal, said core having a higher heat conductivity than said sheath and said cap, said sheath and said cap having a substantially greater resistance to erosion and corrosion than said core.

8. A spark plug comprising a metal shell, a ground electrode secured to the base of said shell, an insulator surrounded and supported by said shell and having a centerbore therein, and a composite electrode inserted in said centerbore, supported and retained by said insulator and having a firing end in spaced relationship to said ground electrode to form a spark gap therebetween, said composite electrode comprising a rod having a metal core, a tubular metal sheath encompassing said core for a substantial portion of its length, and, at said firing end, a metal cap centrally abutting said core, peripherally welded to and abutting said sheath, and forming with said sheath an essentially gas-tight seal, said core having a higher heat conductivity than said sheath and said cap, said sheath and said cap having a substantially greater resistance to erosion and corrosion than said core.

9. A spark plug comprising a metal shell, a ground electrode secured to the base of said shell, an insulator surrounded and supported by said shell and having a centerbore therein, and a composite electrode inserted in said centerbore, supported and retained by said insulator and having a firing end in spaced relationship to said ground electrode to form a spark gap therebetween, said composite electrode comprising a rod having a metal core, a tubular metal sheath of substantially uniform diameter throughout its length encompassing said core for a substantial distance of its length, and, at said firing end, an essentially planar metal cap centrally abutting said core, peripherally welded to and abutting said sheath, and forming with said sheath an essentially gas-tight seal, the cap-abutting end of said core terminating in a flat surface, said core having a higher heat conductivity than said sheath and said cap, said sheath and said cap having a substantially greater resistance to erosion and corrosion than said core.

10. A spark plug comprising a metal shell, a ground electrode secured to said shell, an insulator supported by said shell and having a centrally positioned axial passageway therein, and a composite electrode inserted in said passageway and having a firing end in spaced relationship to said ground electrode to form a spark gap therebetween, said composite electrode comprising a rod having a copper core, a tubular metal sheath encompassing said core for a substantial portion of its length, and, at said firing end, a metal cap centrally abutting said core, peripherally welded to and abutting one end of said sheath, and forming with said sheath an essentially gas-tight seal, a major proportion of said metal sheath and said cap being formed of nickel and having an average thickness below about 0.1 inch, the cap-abutting end of said core terminating in an essentially flat surface and having a cross-sectional area not significantly lesser than the maximum cross-sectional area of the same.

11. A spark plug comprising a metal shell, a ground electrode secured to said shell, an insulator supported by said shell and having a centrally positioned axial passageway therein, and a composite electrode inserted in said passageway and having a firing end in spaced relationship to said ground electrode to form a spark gap therebetween, said composite electrode comprising a rod having a copper core, a tubular metal sheath encompassing said core for a substantial portion of its length, and, at said firing end, a metal cap centrally abutting said core, peripherally welded to and abutting one end of said sheath, and forming with said sheath an essentially gas-tight seal, a major proportion of said metal sheath and said metal cap being formed of nickel, the cap-abutting end of said core terminating in an essentially flat surface positioned less than about 0.1 inch from said firing end of said electrode.

12. A spark plug comprising a metal shell, an insulator supported by said shell and having a centrally positioned axial passageway therein, a composite electrode inserted in said passageway, and a ground electrode secured to said shell and substantially circumferentially spaced apart from the firing end of said composite electrode thereby forming a spark gap therebetween, said composite electrode comprising a rod having a copper core, a tubular Inconel sheath of substantially uniform diameter encompassing said core for a substantial portion of its length, and, at said firing end, an Inconel cap centrally abutting said core, peripherally welded to and abutting one end of said sheath, and forming with said sheath an essentially gas-tight seal.

References Cited
UNITED STATES PATENTS

| | | | |
|---|---|---|---|
| 1,615,994 | 2/1927 | Morrison | 29—25.12 |
| 2,321,840 | 6/1943 | McDougal | 29—25.12 |
| 2,449,403 | 9/1948 | McDougal | 313—354 |
| 2,783,409 | 2/1957 | McDougal | 313—354 |
| 3,017,532 | 1/1962 | Talmey | 313—141 |
| 3,119,944 | 1/1964 | Lentz et al. | 313—141 |

JAMES W. LAWRENCE, *Primary Examiner.*

C. R. CAMPBELL, *Assistant Examiner.*